(12) United States Patent
Weber (10) Patent No.: US 9,644,794 B2
(45) Date of Patent: May 9, 2017

(54) FLOW CELL WITH CAVITY AND DIAPHRAGM

(75) Inventor: Lutz Weber, Zweibrücken (DE)

(73) Assignee: THINXXS MICROTECHNOLOGY AG, Zweibrucken (DE)

(*) Notice: Subject to any disclaimer, the term of this patent is extended or adjusted under 35 U.S.C. 154(b) by 171 days.

(21) Appl. No.: 13/701,804

(22) PCT Filed: May 27, 2011

(86) PCT No.: PCT/DE2011/050016
§ 371 (c)(1),
(2), (4) Date: Dec. 3, 2012

(87) PCT Pub. No.: WO2012/048685
PCT Pub. Date: Apr. 19, 2012

(65) Prior Publication Data
US 2013/0087226 A1   Apr. 11, 2013

(30) Foreign Application Priority Data

Jun. 2, 2010 (DE) .................. 10 2010 022 550

(51) Int. Cl.
F16K 99/00 (2006.01)
F16K 7/12 (2006.01)
C25B 13/00 (2006.01)
F16K 31/44 (2006.01)
F17D 1/08 (2006.01)
B01L 3/00 (2006.01)
F04B 43/02 (2006.01)
(Continued)

(52) U.S. Cl.
CPC ............ *F17D 1/08* (2013.01); *B01L 3/50273* (2013.01); *B01L 3/502738* (2013.01); *F04B 43/021* (2013.01); *F04B 43/043* (2013.01); *F16K 99/0005* (2013.01); *F17D 1/00* (2013.01); *B01L 2300/0816* (2013.01); *B01L 2300/0887* (2013.01); *B01L 2400/0481* (2013.01); *B01L 2400/0638* (2013.01); *F16K 2099/008* (2013.01); *F16K 2099/0084* (2013.01); *Y10T 137/206* (2015.04); *Y10T 137/2202* (2015.04); *Y10T 137/2224* (2015.04); *Y10T 137/598* (2015.04); *Y10T 137/85938* (2015.04)

(58) Field of Classification Search
CPC .................. F16K 2099/0084; F16K 99/0005
USPC ..................... 204/600–650; 251/61.1–61.5
See application file for complete search history.

(56) References Cited

U.S. PATENT DOCUMENTS 4,848,722 A * 7/1989 Webster ................. 251/61.1
5,593,290 A * 1/1997 Greisch ............... F04B 19/006
417/478
(Continued)

FOREIGN PATENT DOCUMENTS

DE     10336849     3/2005
DE  WO 2009040165 A1 * 4/2009 ............ F04B 43/043
(Continued)

*Primary Examiner* — Seth W McKay-Smith
(74) *Attorney, Agent, or Firm* — Lucas & Mercanti, LLP; Klaus P. Stoffel (57) ABSTRACT

An arrangement composed of a flow cell and an apparatus for operating the flow cell, wherein the flow cell has at least two layers, between which the operator device can produce a cavity structure or alter an existing cavity structure with curvature of at least one of the two layers.

14 Claims, 8 Drawing Sheets

(51) Int. Cl.
*F04B 43/04* (2006.01)
*F17D 1/00* (2006.01)

(56) References Cited

U.S. PATENT DOCUMENTS

| | | | |
|---|---|---|---|
| 6,179,586 B1 * | 1/2001 | Herb | F04B 43/043 |
| | | | 417/322 |
| 6,293,012 B1 | 9/2001 | Moles | |
| 6,406,605 B1 * | 6/2002 | Moles | F15C 5/00 |
| | | | 137/833 |
| 6,494,230 B2 | 12/2002 | Chow | |
| 6,929,030 B2 * | 8/2005 | Unger et al. | 137/883 |
| 7,186,383 B2 * | 3/2007 | Webster et al. | 422/505 |
| 7,595,871 B2 | 9/2009 | Weber | |
| 7,650,910 B2 * | 1/2010 | Welle | B01L 3/502738 |
| | | | 137/828 |
| 7,686,040 B2 * | 3/2010 | Welle | F15C 1/04 |
| | | | 137/828 |
| 7,721,762 B2 * | 5/2010 | Welle | B01L 3/502738 |
| | | | 137/828 |
| 7,745,211 B2 * | 6/2010 | Takayama | G09B 23/12 |
| | | | 435/284.1 |
| 7,757,716 B2 * | 7/2010 | Welle | B01L 3/502738 |
| | | | 137/828 |
| 8,011,388 B2 * | 9/2011 | Fuller | F16K 99/0001 |
| | | | 137/625.65 |
| 8,082,810 B2 * | 12/2011 | Moles | B01L 3/5027 |
| | | | 73/864.34 |
| 2002/0148992 A1 * | 10/2002 | Hayenga | A61M 1/14 |
| | | | 251/61.1 |
| 2002/0166585 A1 | 11/2002 | O'Connor et al. | |
| 2009/0159822 A1 * | 6/2009 | Pattekar et al. | 251/129.01 |

FOREIGN PATENT DOCUMENTS

| | | |
|---|---|---|
| DE | 102009001257 A | 4/2010 |
| WO | 9322058 | 11/1993 |
| WO | 2006098817 | 9/2006 |

* cited by examiner

FLOW CELL WITH CAVITY AND DIAPHRAGM

The present application is a 371 of International application PCT/DE2011/050016, filed May 27, 2011, which claims priority of DE 10 2010 022 550.9, filed Jun. 2, 2010, the priority of these applications is hereby claimed and these applications are incorporated herein by reference.

BACKGROUND OF THE INVENTION

The invention relates to an arrangement of a flow cell and a device for operating the flow cell.

Microfluidic flow cells which are well known, for example, from WO 001993022058 A1, U.S. Pat. No. 6,494,230, and DE 103 36 849 A1 have layers which are connected to each other in a fluid-tight manner. A hollow space structure is formed by recesses in at least one of the layers, wherein the hollow space structure comprises a more or less branched duct network for conducting fluid flows. The hollow space structure is in communication with inlet or/and outlet openings in at least one of the layers. Through the inlet or/and outlet openings fluid can be introduced by means of an operating device into the hollow space structure of the flow cell or/and removed therefrom.

The manufacture of such microfluidic flow cells is very complicated. This particularly refers to the precise micro-structuring of the recesses and the precisely fitting, fluid-tight connection of the layers. Manufacturing tolerances in the micrometer range and below must be adhered to.

SUMMARY OF THE INVENTION

The invention is based on the object of creating a novel flow cell to be used with an operating device which is less difficult to manufacture.

This object is met in that the flow cell has at least two layers between which a hollow space structure can be produced by the operating device by creating a bulge in at least one of the two layers, or an existing hollow space structure can be changed.

Since, in the flow cell according to the invention, a hollow space structure according to the invention is produced or finished only when interacting with the operating device, possibilities for a simplified manufacture become apparent. The necessity of micro-structuring for producing the hollow space structure, including the leakage free assembly of the flow cell, can be omitted. By adapting the operating device, the same, possibly non-structured, flow cell can be used for different applications.

For bulging the respective layer, the operating device can be provided to directly produce a force acting on the layer, or/and indirectly by pressing a fluid into the flow cell. A directly produced force may be, for example, a suction force or magnetic force. In the latter case, only a fluid itself pressed between adjacent layers creates the hollow space structure.

In a preferred embodiment of the invention, the operating device comprises an element attachable to the flow cell, wherein the element has a recess into which the respective layer can be bulged.

In particular, the element can be capable of being pressed against the flow cell with lateral, fluid-tight limitation of the hollow space structure.

The element, which can be pressed, advantageously includes an elastic surface which compensates deviations of the flow cell from a planar shape.

By a negative pressure connected to the indentation, a suction force can be produced which ensures the bulge of the layer of the flow cell facing the indentation.

Preferably, the operating device includes a counter element located opposite the aforementioned element, possibly with an indentation corresponding to the indentation to which a negative pressure can be connected which counteracts the negative pressure in the indentation of the first element. A flow cell formed of two films can be clamped between the element and the counter element, and the two films can be bulged between the films in the opposite direction while forming the hollow space structure.

In an alternative embodiment, the counter element may have suction pores distributed over its contact pressure surface. In this case, in a flow cell of two films, one of the two films can be held in a plane while the other film is being bulged. The counter element may have an insert of sintered metal for forming the suction pores.

For maintaining a planar shape in one of the two films, the film facing the counter holder could alternatively be glued to the counter holder, for example, by means of a double adhesive strip.

In another further development of the invention, the operating device includes devices for controlling the extent of the bulge. Depending on the magnitude of the negative pressure connected to one of the layers, the layer can be bulged toward the wall of the indentation to a different extent, up to the complete contact with the wall of the indentation. After making complete contact with the wall of the indentation, the hollow space cross section no longer depends on the magnitude of the negative pressure. As long as the bulged position has not yet reached the wall of the indentation, the extent of the bulging can be controlled steplessly by varying the negative pressure.

Preferably, it is also possible to connect the aforementioned indentation to an excess pressure which makes it possible to quickly reverse the formation of the hollow space structure and to press any fluid contained in the hollow space structure completely out of the hollow space structure. Advantageously, in this manner, the effectiveness of the rinsing processes in flow cells can be improved and/or the contamination by various fluids to be transported successively through the duct network can be reduced.

In accordance with a further development of the invention, the element or counter element attachable to the flow cell has at least one throughopening, for example, for a connecting line or a valve element which is movable perpendicularly to the planes of the layer. A valve element can interrupt in a targeted manner, for example, a fluid line duct of the formed hollow space structure.

An element slidable parallel to the plane of the layers can be utilized for transporting fluid within the hollow space structure, or for spatially changing the produced hollow space structure.

It is understood that the hollow space structure preferably includes at least one fluid line duct, particularly a duct network. At least one of the two layers has at least one opening, i.e. an outlet or/and inlet opening, connected to the hollow space structure.

In an embodiment, one of the two layers is a flexible film and the other layer may be a substrate plate somewhat stiffer that the flexible film. In a preferred embodiment, the flexible film and the stiffer substrate plate are of the same material, particularly the same synthetic material. When the stiffer substrate plate is sufficiently stiff, it is sufficient to use a single element attachable to the flow cell. A counter element is not required.

As already mentioned above, the flow cell could also include two flexible films as layers. Combinations between a stiffer plate and two films resting against oppositely located plate surfaces are possible, wherein a hollow space structure can be formed always between plate and film. The recesses connecting the hollow space structures can then be formed in the substrate plate.

At least one of the layers is preferably elastically deformable, so that a hollow space structure, which may have been formed, can be scaled back by itself.

In accordance with another further development of the invention, the two layers are connected to each other in a fluid-tight manner, with their surfaces facing each other adjacent to the hollow space structure or/and at the border of at least one of the two layers.

If the connection between the two layers reaches up to the hollow space structure, the attached element or counter element is possibly not controlling for limiting the hollow space. The hollow space may be laterally limited by the connection between the two layers. For connecting the layers, welded and glued connections can be considered. Connections by means of a double-adhesive strip can be considered.

In accordance with a preferred embodiment of the invention, the layers are connected to each other circumferentially in a fluid-tight manner only at the edges and the element, or possibly counter element, is responsible for the lateral edge limitation of the hollow space structure. The two layers do not actually have to be connected to each other. In the latter case, the layers may consist of various materials which cannot be connected to each other by frictional engagement without adhesives, for example, of glass and synthetic material, wherein such material pairings can be advantageous under certain conditions or even indispensable for the tests to be carried out.

In the following, the invention will be described in more detail with the aid of embodiments and the attached drawings which refer to these embodiments. In the drawing:

DETAILED DESCRIPTION OF THE INVENTION

A flow cell, shown in FIGS. 1 to 4, comprises a plate-shaped substrate 1 which forms a first layer and a flexible elastic film 2 which forms the second layer. At throughopenings 3, which are formed in the substrate 1, a tubular connecting piece 4 each is attached to the side of the substrate 1 which faces away from the film 2, wherein the connecting piece 4 can be connected for supplying or removing fluid by means of a pipette, a LUER connector, a hose or the like. The substrate 1 consists, in the illustrated embodiment, of a synthetic material and is injection molded. The film 2, whose thickness preferably is between 0.005 mm and 0.2 mm, also consists of a synthetic material, preferably the same synthetic material as the substrate, preferably of synthetic materials such as PMMA, PC, PS, PP, PE, PEEK, COC, COP, or another synthetic material conventionally used in flow cells. In particular, other materials, such as, glass or silicon, can also be considered for the substrate.

In the illustrated embodiment, both the substrate 1 and the film 2 do not have structuring. The film 2 and the substrate 1 are connected to each other in a border region, either permanently or releasably, for example, glued or welded (for example, by ultra-sound welding or laser welding). For connecting film and substrate it would also be possible to utilize a double adhesive strip, for which purpose, especially the substrate 1, may have an indentation for receiving the adhesive strip aligned flush with the substrate surface. For releasably connecting film 2 and substrate 1, additionally clamping elements, particularly a clamping frame, acting on the borders may be used.

Figure 1:
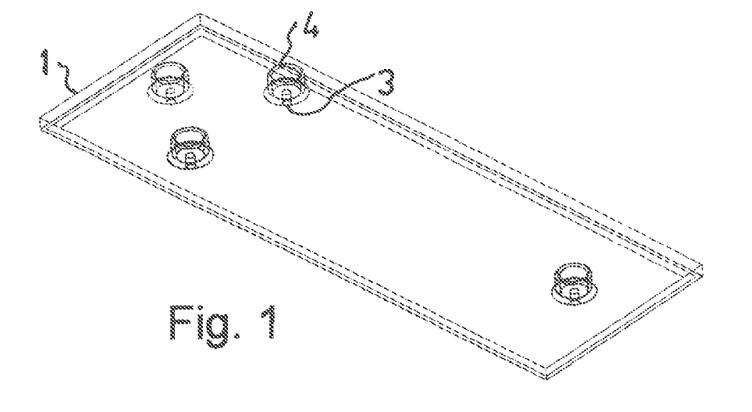
FIG. 1 shows a flow cell according to the invention.
Figure 2:
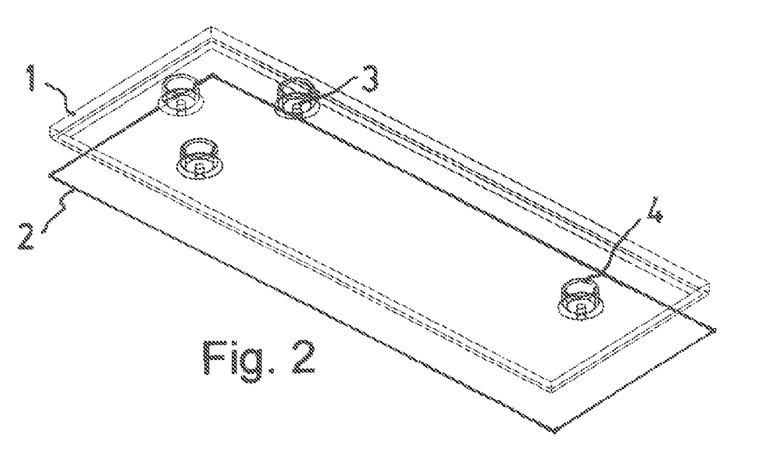
FIG. 2 shows the flow cell of FIG. 1 in an expanded view.
Figure 3:
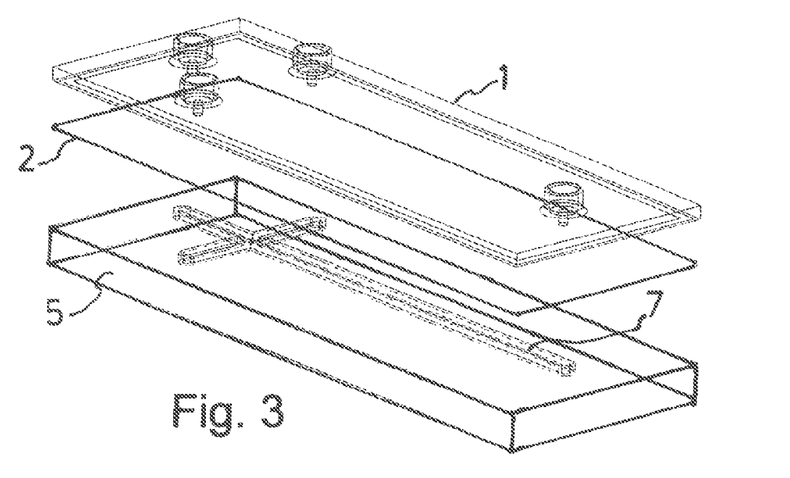
FIG. 3 shows the flow cell in the illustration of FIG. 2 with an element which can be pressed against the flow cell for forming a duct structure.
Figure 4:
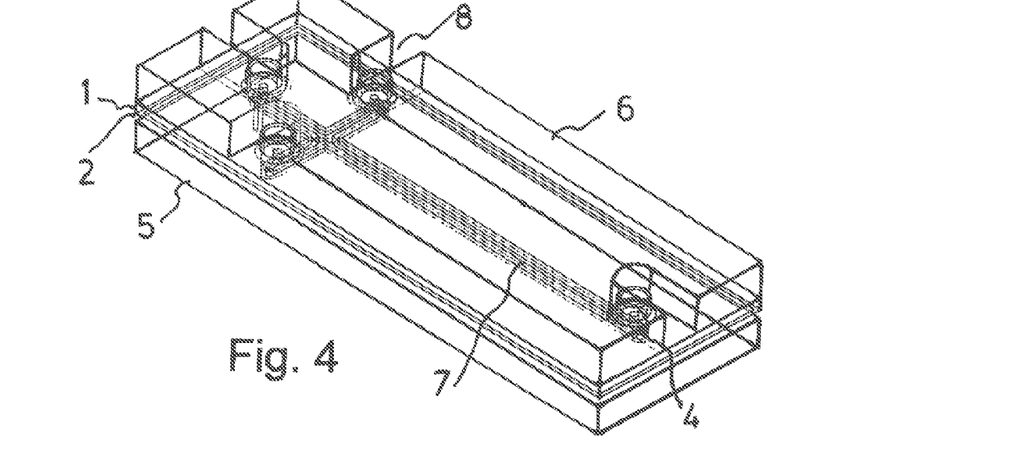
FIG. 4 shows the flow cell of FIG. 1 between the element of FIG. 3 and a counter element which can be attached to the side of the flow cell which is located opposite the element of FIG. 3,
FIGS. 5 to 12 show illustrations explaining the formation of hollow space structures.

A plate shaped element 5 shown in FIG. 3 has an indentation 7 formed by intersecting grooves. Together with a counter element 6 shown in FIG. 4, the element 5 forms a clamping device which is a component of a device, not otherwise illustrated, for operating the flow cell of FIG. 1. As can be seen in FIG. 4, the flow cell 1 can be clamped between the element 5 and the counter element 6 in such a way that the element 5, with the recess 7, comes to rest against the film 2, and the element 6 which has border recesses 8 for receiving the protruding connecting pieces 4, comes to rest against the substrate 1.

Figure 5:
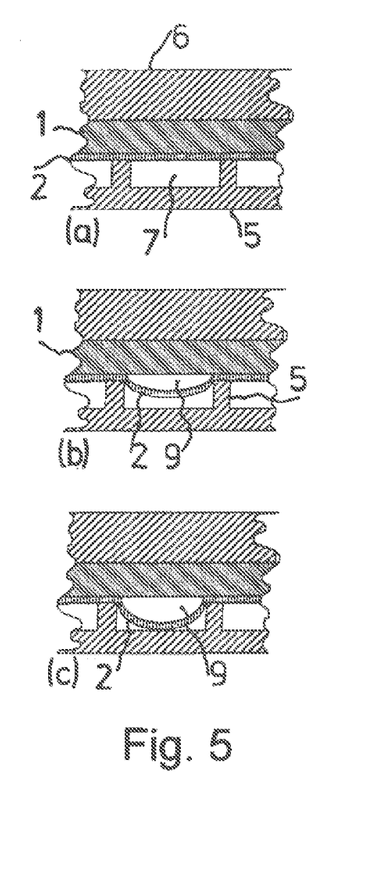

During operation of the flow cell, the connecting pieces 4 are each connected to a line for supplying a fluid or/and for discharging, or for the purpose of ventilating during the fluid transport with ambient atmosphere, and the flow cell is clamped between element 5 and element 6. Except in the area of the indentation 7, the element 5 presses the film 2 against the substrate 1. The operating device mentioned above, which includes the elements 5, 6, additionally has a suction device by means of which a negative pressure can be connected to the indentation 7 between the film 2 and the element 5. Because of the suction force produced by this negative pressure, the flexible elastic film 2 bulges out and into the indentation 7 so as to form a hollow space structure between foil and substrate, as this is apparent from FIGS. 5b and 5c. A fluid line duct 9 is formed which is laterally defined and closed in a fluid-tight manner by the element 5, which presses the film 2 against the substrate 1. In the described state of operation the flow cell has, between the substrate 2 and the film 1, a duct structure corresponding to the basic shape of the indentation 7.

The extent of the bulging of the film 2 in the indentation 7 depends on the magnitude of the applied negative pressure. Typical aspect relationships are between 2 and 1,000. In the illustrated embodiment, the mentioned operating device comprises a control for varying the negative pressure and thus, for varying the cross section of the fluid line duct 9 or the hollow space ducts or hollow space structure. In accordance with FIG. 5c, the negative pressure is dimensioned such that the film 2 rests against the floor of the indentation 7. When the film 2 rests completely against the indentation walls, a negative pressure reduction does not make possible a further increase of the cross section of the fluid line duct. In order to facilitate a complete contact of the film at the wall of the indentation, the shape of the indentation may be adapted to the shape of the bulging film.

The counter element 6 preferably consists of a metal or glass. In the latter case, a visual observation of the fluid flows in the flow cell is made possible. For this purpose, an observation window of glass may also be sufficient. The element 5 preferably is a metal part.

The counter element 6 can be omitted if the substrate 1 has a sufficiently high stiffness.

Preferably, the above mentioned control of the operating device facilitates variation of the pressure connected to the indentation 7 up into the positive range. By admitting an excess pressure, the hollow space structure of the flow cell can, after its use, be emptied quickly and more or less completely.

The above described possibility of producing a hollow space structure with variable dimensions is of particular importance for the optical detection (absorption, transmission, reflection, fluorescence). In the case of a variable hollow space cross section, the light can penetrate different thicknesses of the fluid. For example, in the same measuring position different concentration ranges of an analytic compound, due to changes of the hollow space cross section, can be measured. Variable cross sections are of further significance for carrying out a capillary electrophoresis in which, as a rule, media having high viscosity, such as gels, are used as carrier liquids for a DNA sample as carrier to be analyzed and to be opened by means of electrophoresis. This opening step succeeds the better, the smaller the duct cross section is. Because of the high viscosity of the gel, filling of the duct is time consuming despite high pressures. Here, the possibility of adjusting a fluid line duct with large cross section would be helpful.

Figure 6:
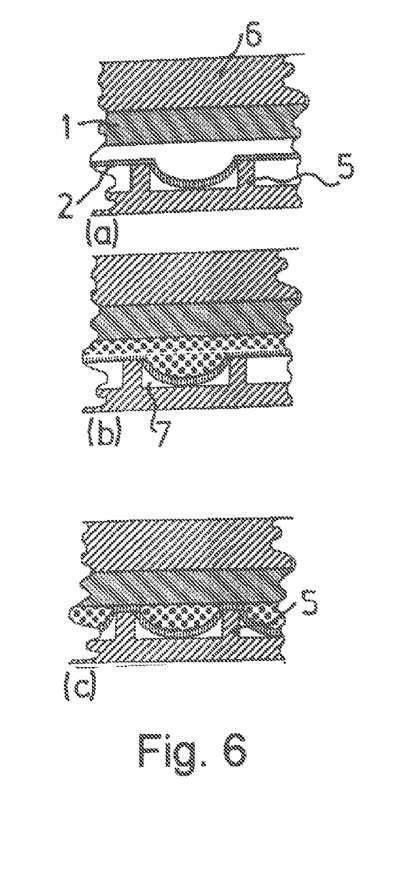

In accordance with FIG. 6, there is the possibility during the phase of filling the flow cell, to press the film 2 not yet against the substrate 1 by means of the element 5, so that a distance remains between the film 2 and the substrate 1. A fluid which has been pressed in, and is enclosed at the border because of the connection of film and substrate, bulges the film 2 as a result of its own pressure into the indentation 7. Alternatively, the element 5 may have further webs, preferably resilient or elastically supported, which when contacting the film 2 form a hollow space for the gel filling which is significantly greater as compared to the hollow space 7. Simultaneously, the vacuum adjacent the hollow space 7 provides such an indentation. Only after being filled, the actual duct formation takes place, by pressing the film 2 against the substrate 1.

Figures 7, 8, 9:
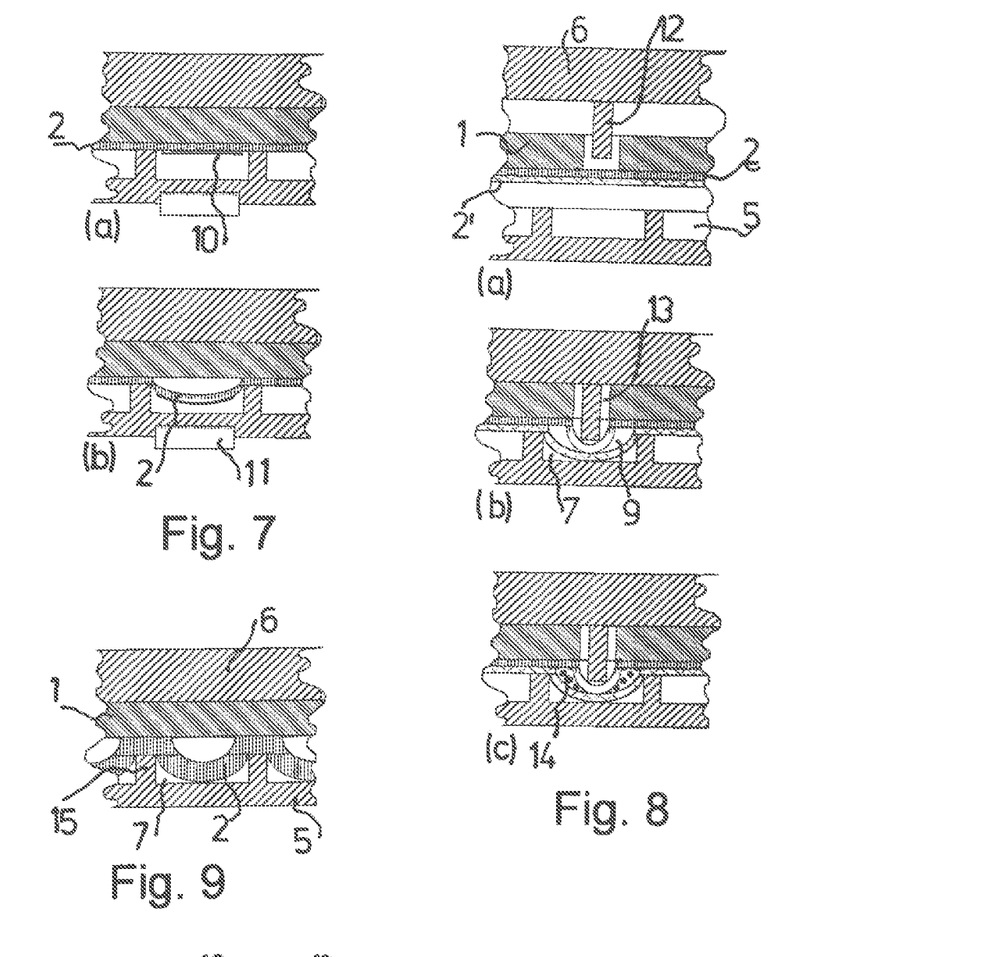

As can be seen from FIGS. 7 to 9, the force for bulging the film 2 into the indentation 7 can also be produced differently from applying a negative pressure to the indentation 7.

In the area of the indentation 7, the film 2 can be provided with a metal coating 10 which is applied by a thin layer process or galvanically against which an electrical field or/and magnetic field can exert a force. Therefore, by means of a device 11 for producing a magnetic field, the film 2 can bulge into the indentation 7 (FIG. 7b).

In an embodiment illustrated in FIG. 8, two flexible elastic films 2, 2' are provided. A counter element 6 has, opposite the indentation 7 in an element 5, a die 12 which engages in a passage 13 in the substrate 1. The width of the passage 13 is smaller than the width of the indentation 7 in the element 5. The film 2 facing the substrate is fixedly connected to the substrate 1. The films 2, 2' rest loosely against each other; in the state in which the films 2, 2' are clamped together by the elements 5, 6, the die 12 of the counter element 6 bulges the films 2, 2' into the indentation 7. Between the films 2, 2', a duct 9 is formed for conducting a fluid 14 (FIG. 8c). Preferably, the thickness of the inner film 2 is smaller than the thickness of the outer film 2'. Alternatively, the inner film 2 consists of a soft material, such as a silicon or thermoplastic elastomer or rubber. This results in the case of equal thickness and deflection in a smaller force of the die 12 or, in the case of equal force, in a greater thickness of the film 2. In a manner advantageous with respect to manufacturing technology, the elastic film 2 or a film area are manufactured as a single piece with the substrate 1 by two-component injection molding. It is essential for the function of the flow cell that the elastic material does not come into contact with the fluid to be transported.

In the embodiment of FIG. 9, a rubber-like film 2 of an elastomer (silicon, TPE) is used. Webs 15 of an element 5, defining the indentation 7, press the film 2 against a substrate 1, wherein the film 2 bulges between the webs 15 against the pressure force of the webs 15 into the indentation 7. Typical film thicknesses may be in the millimeter range.

Figure 10:
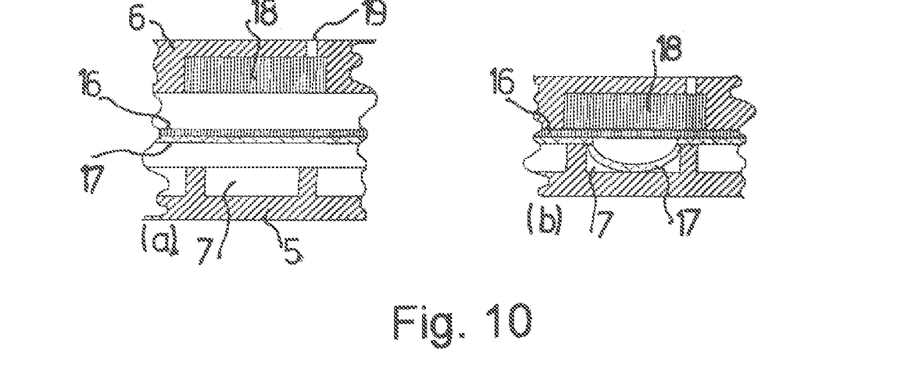
Figure 11:
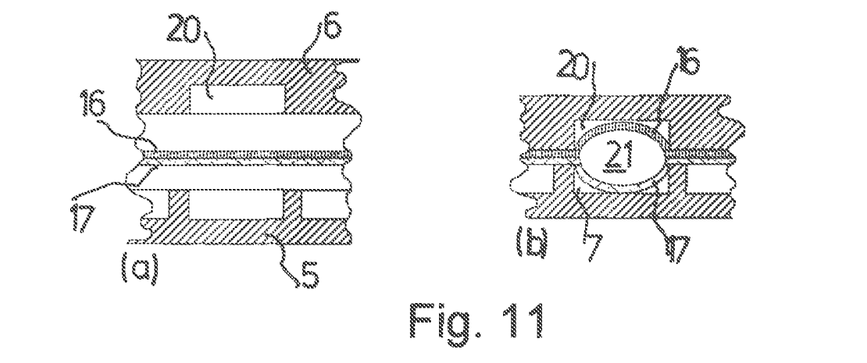

Shown in FIGS. 10 and 11 are embodiments with flow cells, which consist only of two flexible, elastic, unstructured films 16 and 17. An element 5 with an indentation 7 and a counter element 6 press the foils together. A negative pressure can be applied to the indentation.

In the embodiment of FIG. 10, the counter element 6 has, as an insert, a suction body 18 with suction pores which can also be connected to a negative pressure line 19. While the negative pressure applied to the indentation 7 ensures bulging of the film 17, the film 16 is held by the negative pressure applied to the suction body 18, as shown in FIG. 10b, is held at the planar surface of the counter element 6 facing the film 16, or the suction body 18. Preferably, the suction body 18 is formed by a sintered metal.

In the embodiment of FIG. 11, an indentation 20 is provided instead of the suction body 18 in the counter element 6, wherein the indentation 20 is, with respect to its dimensions, equal to the indentation 7 of the element 5. A negative pressure can be applied to the indentation 7 as well as to the indentation 20. In accordance with FIG. 11b, this has the result that film 17 is bulged into the indentation 7 and the film 16 into the indentation 20, and a fluid line duct 21 with correspondingly large, approximately round cross section is created.

Figure 12:
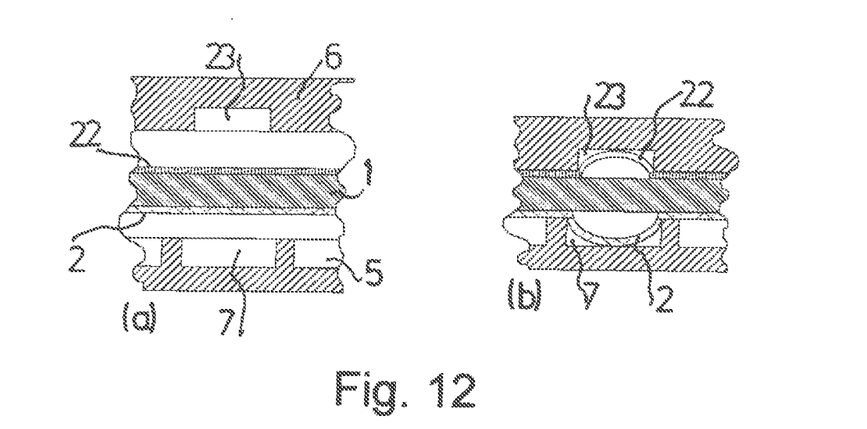

In an embodiment illustrated in FIG. 12, films 2 and 22 are arranged on oppositely located sides of a substrate 1. An element 5 has an indentation and a counter element 6 has an indentation 23. A negative suction pressure can be applied to the indentations 7, 23 by means of which the film 2 can bulge into the indentation 7 and the film 22 into the indentation 23. A hollow space structure is formed on both sides of the substrate 1, wherein these hollow space structures can be the same or different.

Figure 13:
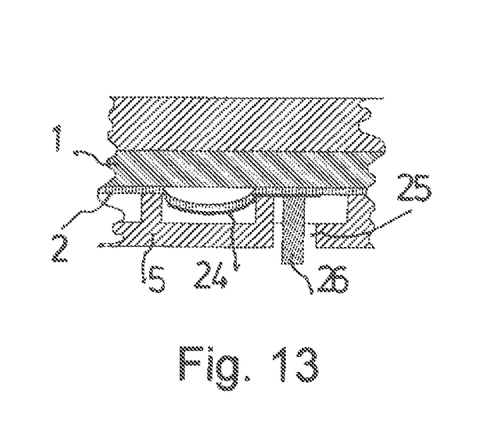
FIGS. 13 to 15 show flow cells with hollow space structures which have been formed, and electrodes arranged in the hollow space structures.
Figure 14:
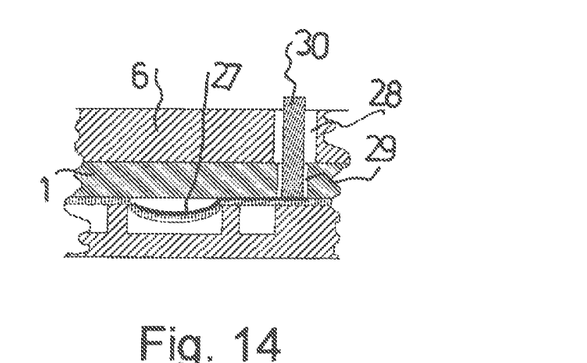
Figure 15:
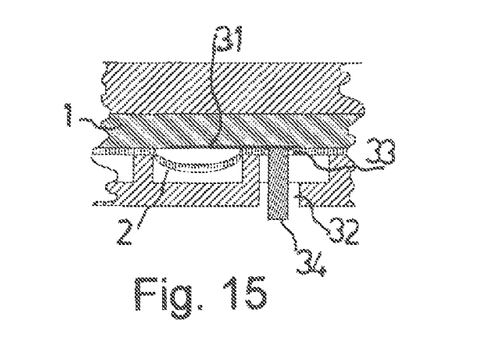

In the embodiments illustrated in FIGS. 13 to 15, flow cells are used in which thin layer electrodes of, for example, gold, silver, platinum, aluminum, ITO, or other metals or metal oxides are integrated and which may serve as electrical sensors, actuators, or resistance heaters. The conventional layer thicknesses are between 10 nanometers and 500 nanometers, particularly between 20 nanometers and 200 nanometers.

FIG. 13 shows a flow cell with a substrate 1 and a film 2 on the outer side of which an electrode 24 is arranged. An element 5, which can be pressed against the flow cell, has a passage 25 for an element 26 which contacts the electrode 24.

In the embodiment of FIG. 14, an electrode 27 is arranged on the inner side of a film 2 between the film 2 and a substrate 1. A counter element 6, which can be connected to the substrate 1, includes a passage 28 and the substrate 1 has a passage 29 for an element 30 which contacts the electrode 27.

In the embodiment of FIG. 15, an electrode 31 is accommodated between a film 2 and a recess in substrate 1. An element 5, which can be pressed against the film 2, includes a passage 32 and the film 2 includes a passage hole 33 for an element 34 which contacts the electrode 30. For insulating the electrode 31 relative to the fluid to be transported, the fluid may be covered, for example, by a dielectric coating or film.

Figure 16:
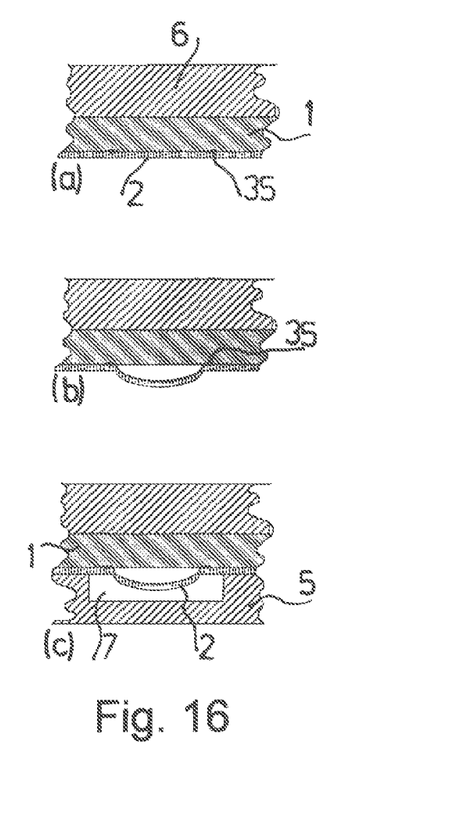
FIGS. 16 to 20 show further illustrations explaining the formation of hollow space structures.

In the embodiments illustrated above, the lateral limitation of the formed hollow space structures is determined by the element 5, or the counter element 6, which presses together the parts of the flow cell. FIG. 16 shows an embodiment in which this limitation exists as a result of a fluid-tight border connection 35 between a film 2 and a substrate 1. The fluid-tight border connection 35 is preferably a welded connection. As can be seen in FIG. 16c, a hollow space 7 formed in an element 5 is wider than the distance between oppositely located sections of the border connection 35. Advantageously, this produces the result that, when positioning the element 5 opposite the duct-like hollow space, greater position tolerances are permissible.

Figure 17:
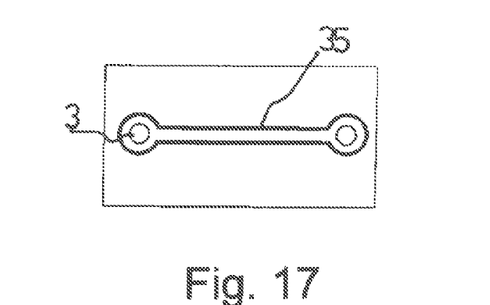

FIG. 17 shows a top view of the border connection 35 obtained by laser welding of the duct-like hollow space structure which is in communication with passage holes 3 in the substrate.

Figure 18:
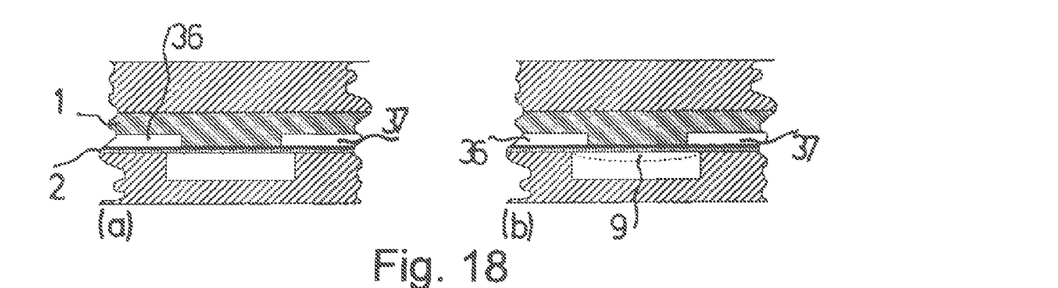

The hollow space structure produced by the operating device in the flow cell can also only serve for supplementing an already existing permanent hollow space structure. FIG. 18 shows a corresponding embodiment with a substrate 1 in which permanent duct-shaped hollow spaces 36 and 37 are provided, wherein flow takes place from right to left or vice-versa. In addition, a fluid flow duct 9 can be produced which connects these hollow spaces.

Figure 19:
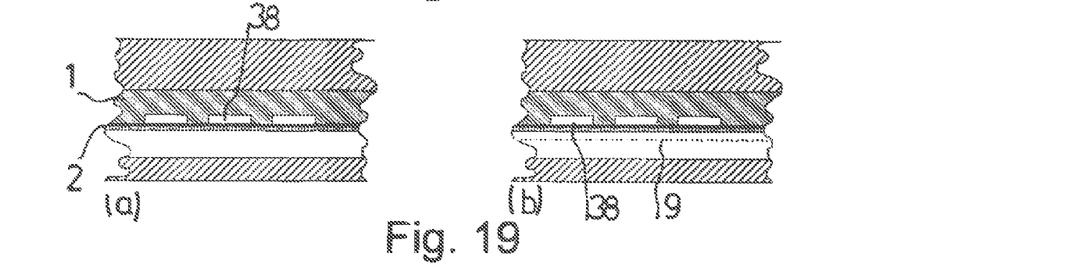

In the embodiment illustrated in FIG. 19, several permanent hollow spaces 38 are provided in a substrate 1, for example, reaction spaces, detection spaces and mixing spaces in the form of indentations with typically lateral dimensions of 0.1 mm² to 1,000 mm². As illustrated in FIG. 19b, the reaction hollow spaces 38 are connected to each other in the flow direction by a producible fluid line duct 9.

Figure 20:
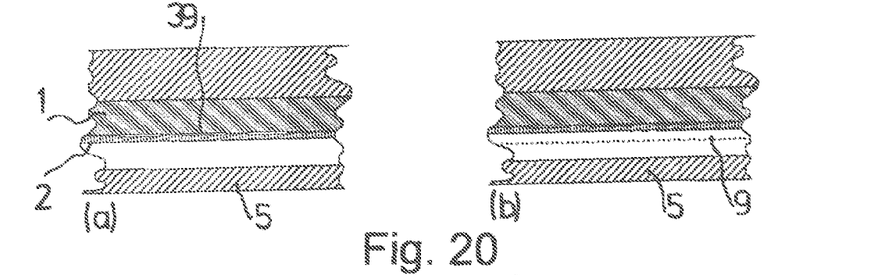

In the embodiment of FIG. 20, instead of the hollow spaces 38, functionalized areas 39 are provided on the substrate or the film which may be covered, for example, with dry reagents, DNA sequences, proteins, cells or PCR reagents. Typically, the height of such coverings is only a few micrometers. As in the embodiment of FIG. 19, the functionalized areas 39 can be connected to each other in the flow direction by a producible fluid line duct 9.

Figure 21:
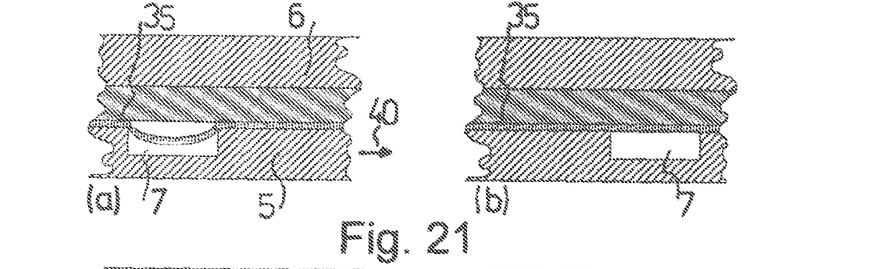
FIGS. 21 to 25 show illustrations explaining additional functions of operating devices.

The operating device can assume further functions beyond its function for forming a hollow space structure. In an embodiment illustrated in FIG. 21, a counter element 6 is additionally laterally movable in accordance with arrow 40. An area defined by a permanent border connection 35, can be moved into a position illustrated in FIG. 21b, in which a formed fluid line duct 9 is eliminated once again.

Figure 22:
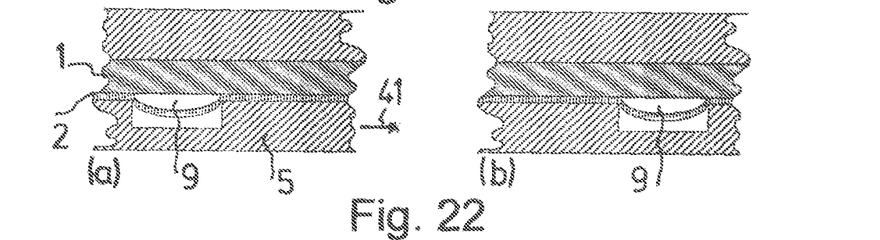

In the embodiment of FIG. 22, an element 5 is also movable laterally in accordance with arrow 41. A producible fluid line duct 9 is defined by the element 5 resting against the flow cell, i.e. a film 2 is not connected to a substrate 1. By displacing the element 5, in accordance with arrow 41, a formed duct or duct area 9 and thus, the fluid contained therein can be laterally displaced.

Figure 23:
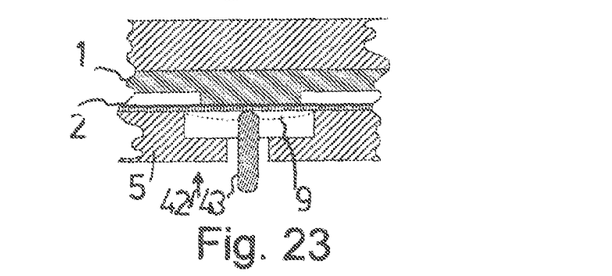

In an embodiment illustrated in FIG. 23, an element 5 attachable to a fluid cell with a substrate 1 and a film 2 has, in accordance with arrow 42, a slide member 43 which is movable perpendicularly to the plane of the substrate or the film, wherein the slide member 43 presses together a duct 9 in the shape of a line which has been formed and, thus, carries out a valve function.

Figure 24:
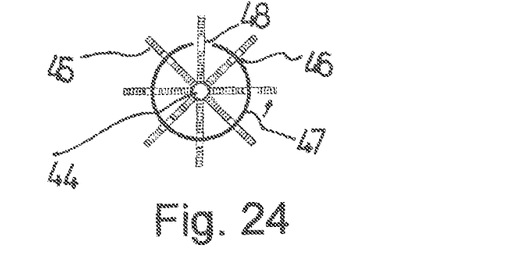

FIG. 24 shows a portion of a flow cell with a central inlet 44 and fluid line ducts 45, formed partially permanently in a substrate, extending star shaped from the inlet 44 and including a section 46 which can be unlocked by the flowing fluid itself between the substrate and a film. A valve ring support 47 includes an interruption 48 which extends coaxially relative to the central inlet 44. Depending on the location of the interruption 48, one of the fluid line strands 45 can be released.

It is understood that the above described embodiments can be combined with each other to form complex flow cells.

Figure 25:
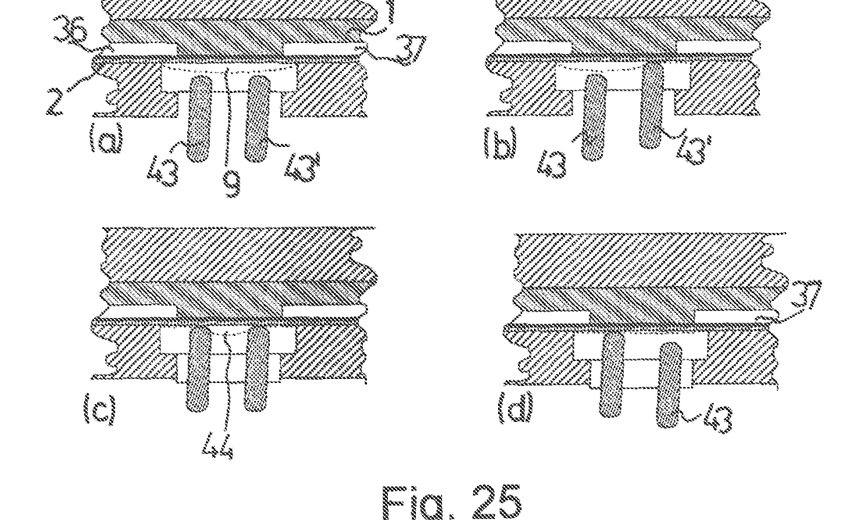

An embodiment illustrated in FIG. 25 differs from the embodiment according to FIG. 23 by having another slide member 43'. A medicament to be dosed flows from left to right through a permanent duct 36 and travels through its own pressure into a duct 9 before it flows further through another permanent duct 37. During dosing operation, the slide member 43' is initially closed. The reach of the duct 9 extends up to the closure by this slide member. By closing the slide member 43, a certain dosing quantity is enclosed between the closures formed by the slide members 43, 43' (FIG. 25c). For the precise determination of the enclosed quantity, the level of the bulging of the film 2 can be measured by means of an optical sensor by transmission, reflection, or triangulation, alternatively electrically, for example, capacitively with the use of thin layer electrodes.

The enclosed dosing quantity can also be released by opening the slide member 43'. By means of the restoring force of the film 2, the dosing quantity is pressed into the duct 37.

The duct area 9 could additionally be connected to a permanently closed reservoir, not shown, which is filled with air or another gas, which serves as a pressure reservoir in addition to the bulging of the film and reinforces the transportation of the dosed quantity.

If, in addition to the two actors or slides, the film area corresponding to the duct area 9 is connected to a device proposed in accordance with the invention for directly producing a force which causes the bulging of the film, a pump function can be realized in this manner, in which a duct area 9, cyclically formed between the slide members, functions as a pump chamber and the two actors act as input or output valves.

Figure 26:
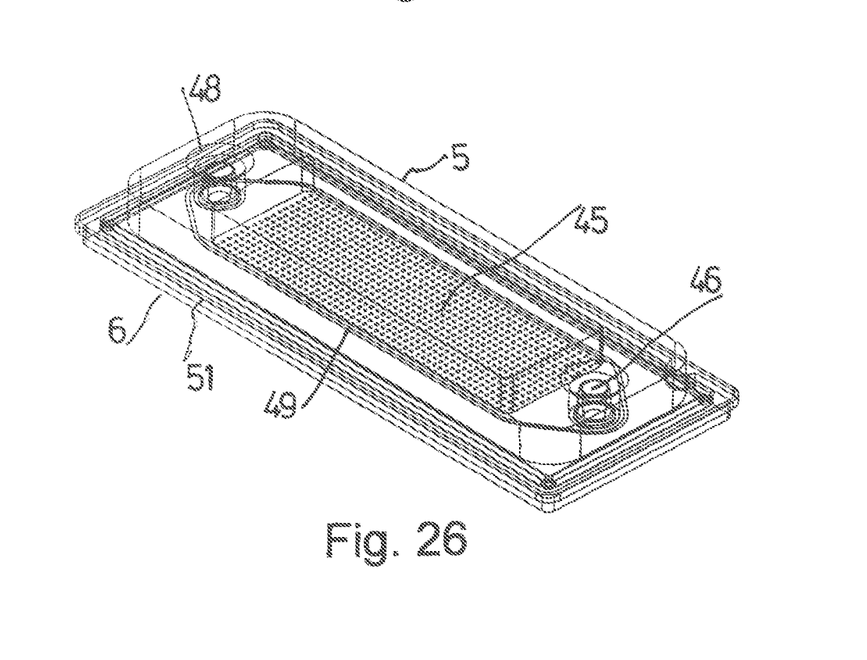
FIGS. 26 and 27 show another embodiment according to the invention with a flow cell including a substrate of glass.
Figure 27:
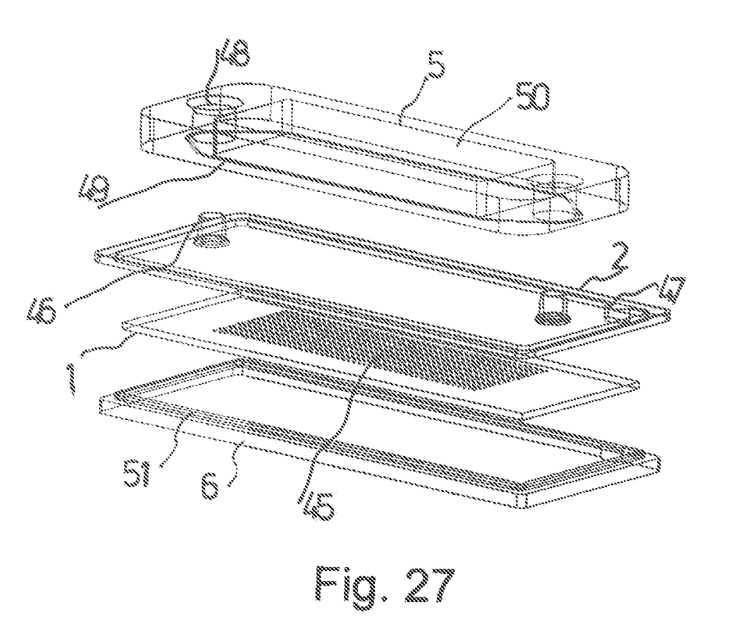

FIGS. 26 and 27 show an embodiment with a flow cell which includes a substrate plate 1 of glass in the form of an object carrier. On the substrate plate 1 of glass, a field of functionalized areas 45 is formed, as they are used, for example, in DNA hybridizing tests (DNA arrays). A flexible elastic film 2 of synthetic material, preferably of PC, COC, COP, PMMA, PC, rests against the substrate plate 1, wherein the substrate plate 1 is provided with through holes and connecting pieces 46 arranged concentrically with the through holes. Preferably, the connecting pieces are of synthetic material and are welded to the film. Positioning structures 47 at the border of the film ensure a precise alignment of the film relative to the substrate plate. An element 5, which is attachable to the film 2, is provided with recesses 48 for receiving the connecting pieces 46 and is provided with a circumferential web 49 resting against the film 2, wherein, as seen in the top view, the web 49 surrounds the field of functionalizing areas 45 and the connecting pieces 46. The element 5 additionally has an insert 50 of porous sintered metal. A negative pressure can be applied to the recess which receives the insert. A counter element 6, which can be placed against the substrate plate 1, is provided with a circumferential frame 51 for positioning the substrate plate 1.

During operation of the flow cell, the connecting pieces 46 are connected to lines which supply and discharge fluid, particularly hose lines. A negative pressure applied to the sintered metal portion of the element 5, has the result that the film 2 rests against the sintered metal 50 and, thus, in the area of the functionalized surface of the glass substrate, that a hollow space is formed having a constant height of preferably 20 to 200 micrometers. The height of the webs 49 corresponds to the target height of the hollow space duct 9 in addition to the thickness of the used film 2. In the areas in flow direction in front of and behind the functionalizing surface, the respective hollow space areas are developed partially by the pressurized fluid itself.

Alternating applications of negative pressure and excess pressure to the sintered metal insert 50 during a hybridizing process, lead, because of the deflection of the film, to a usually smooth fluid movement and advantageously support the material exchange as well as the DNA hybridization.

After a hybridizing process, prior to its disassembly and removal, air can be conducted through the flow cell and the flow cell can be emptied.

When the substrate plate 1 is optically transparent, the pattern of the reactions can be observed directly optically or fluorescent optically. Alternatively, the detection takes place after the assembly of the flow cell with the use of the conventional measuring devices.

The above described flow cells are suitable for use in the analysis and/or synthesis of fluids and gasses. Considered maybe analyses by means of capillary electrophoresis, immunoassays, molecular-genetic assays, cell based assays, devices for fluid control in miniaturized fuel cells, dispenser systems, micro-reactors, as well as the construction of miniaturized pump and valve systems.

The invention claimed is:

1. An arrangement, comprising: a first device having at least two layers; and a second device having an element with an indentation, wherein the first device is operated by the second device so as to form a hollow space structure of a flow cell comprising a channel network within the first device, wherein the second device is releasably coupled to the first device for operating the first device, the second device being operative to bulge at least one of the at least two layers into the indentation so as to create the hollow space structure between the two layers, to press the at least two layers against one another so as to seal the hollow space structure in a fluid-tight manner, and to maintain the sealed hollow structure during operation of the first device as a flow cell.

2. The arrangement according to claim 1, wherein the second device is operative to bulge the respective layer directly by producing a bulging force or indirectly by pressing a fluid into the flow cell.

3. The arrangement according to claim 2, wherein the force produced directly for bulging is electrical, magnetic, mechanical, or pneumatic.

4. The arrangement according to claim 1, wherein the element can be pressed against the flow cell while limiting the hollow space structure.

5. The arrangement according to claim 1, wherein the counter element has an indentation corresponding to the indentation in the element.

6. The arrangement according to claim 1, wherein a negative pressure and an excess pressure can be applied to the indentation or the indentations.

7. The arrangement according to claim 1, wherein the second device comprises units for statically or dynamically controlling an extent of the bulging.

8. The arrangement according to claim 1, wherein the second device comprises units for laterally displacing the bulge.

9. The arrangement according to claim 1, wherein in addition to the hollow space structure produced by bulging, the flow cell comprises a permanent hollow space structure or additional elements.

10. The arrangement according to claim 9, wherein the additional elements are electrodes or functionalized areas.

11. The arrangement according to claim 1, wherein at least one of the two layers has at least one opening connected to the hollow space structure.

12. The arrangement according to claim 1, wherein one of the two layers is a flexible film and another of the two layers is a substrate plate that is stiffer than the film.

13. The arrangement according to claim 1, wherein the two layers are connected to each other in a fluid tight manner at surfaces facing each other adjacent to the hollow space structure or at a border of at least one of the layers.

14. The arrangement according to claim 1, wherein the two layers consist of different materials which cannot be connected by frictional engagement.

* * * * *